US011911781B2

(12) United States Patent
Rüger

(10) Patent No.: US 11,911,781 B2
(45) Date of Patent: Feb. 27, 2024

(54) SUPPLY SYSTEM FOR SUPPLYING MULTIPLE CONSUMERS WITH AN APPLICATION SUBSTANCE

(71) Applicant: Dürr Systems AG, Bietigheim-Bissingen (DE)

(72) Inventor: Alexander Rüger, Murr (DE)

(73) Assignee: Dürr Systems AG, Bietigheim-Bissingen (DE)

( * ) Notice: Subject to any disclaimer, the term of this patent is extended or adjusted under 35 U.S.C. 154(b) by 0 days.

(21) Appl. No.: 17/862,505

(22) Filed: Jul. 12, 2022

(65) Prior Publication Data

US 2022/0339654 A1 Oct. 27, 2022

Related U.S. Application Data

(63) Continuation of application No. 17/047,408, filed as application No. PCT/EP2019/059596 on Apr. 15, 2019, now Pat. No. 11,413,639.

(30) Foreign Application Priority Data

Apr. 19, 2018 (DE) ..................... 10 2018 109 344.6

(51) Int. Cl.
*B05B 12/14* (2006.01)
*B05B 13/04* (2006.01)
(Continued)

(52) U.S. Cl.
CPC ........ *B05B 12/1481* (2013.01); *B05B 12/149* (2013.01); *B05B 13/0431* (2013.01);
(Continued)

(58) Field of Classification Search
USPC .......................................... 118/323, 300, 321
See application file for complete search history.

(56) References Cited

U.S. PATENT DOCUMENTS 3,023,968 A 3/1962 Mitchell
4,390,126 A 6/1983 Buchholz et al.
(Continued)

FOREIGN PATENT DOCUMENTS

DE 19649888 A1 6/1998
DE 10117917 A1 10/2002
(Continued)

OTHER PUBLICATIONS

International Search Report and Written Opinion for PCT/EP2019/059596 dated Jul. 31, 2019 (15 pages; with English translation).
(Continued)

*Primary Examiner* — Yewebdar T Tadesse
(74) *Attorney, Agent, or Firm* — Bejin Bieneman PLC

(57) ABSTRACT

The disclosure relates to a supply system for supplying multiple consumers with a substance to be applied, preferably paint, for application to motor vehicle bodies and/or add-on parts thereof. The supply system comprises a feed line, a return line, a first consumer device which comprises a first consumer, the first consumer being connected to the feed line and the return line and preferably forming a first consumer of the feed line in the flow direction of the substance to be applied, and a further consumer device which comprises a further consumer, the further consumer being connected to the feed line and the return line and preferably forming a last consumer of the feed line in the flow direction of the substance to be applied and/or being arranged after the first consumer in the flow direction of the substance to be applied. The supply system is distinguished in particular in that the feed line is connected to the return line via a connecting line. The disclosure relates further to an associated coating installation and to an associated supply method.

19 Claims, 4 Drawing Sheets

(51) Int. Cl.
*B05B 15/58* (2018.01)
*B05C 11/10* (2006.01)

(52) U.S. Cl.
CPC ........... *B05B 13/0452* (2013.01); *B05B 15/58* (2018.02); *B05C 11/1044* (2013.01)

(56) References Cited

U.S. PATENT DOCUMENTS

| | | | | |
|---|---|---|---|---|
| 5,096,120 | A | 3/1992 | Luckarz | |
| 6,010,032 | A | 1/2000 | Bermylen et al. | |
| 8,689,730 | B2 | 4/2014 | Clifford | |
| 10,655,615 | B2 | 5/2020 | Smith et al. | |
| 2017/0197224 | A1 * | 7/2017 | Taube | F16L 55/46 |
| 2018/0128251 | A1 | 5/2018 | Smith et al. | |

FOREIGN PATENT DOCUMENTS

| | | | |
|---|---|---|---|
| DE | 10226263 | A1 | 12/2003 |
| EP | 0021182 | A1 | 1/1981 |
| EP | 0347607 | A2 | 12/1989 |
| EP | 0885659 | A1 | 12/1998 |
| JP | H0290962 | A | 3/1990 |
| JP | H02149369 | A | 6/1990 |
| JP | 2007175631 | A | 7/2007 |
| WO | 2016156833 | A1 | 10/2016 |

OTHER PUBLICATIONS

Chinese Office Action and Search Report for Application No. CN201980026718.9 dated Oct. 11, 2021 (21 pages; with English machine translation).

* cited by examiner

SUPPLY SYSTEM FOR SUPPLYING MULTIPLE CONSUMERS WITH AN APPLICATION SUBSTANCE

CROSS-REFERENCE TO RELATED APPLICATIONS

This application is a continuation of, and claims priority to, U.S. patent application Ser. No. 17/047,408, filed on Oct. 14, 2020, which application is a national stage of, and claims priority to, Patent Cooperation Treaty Application No. PCT/EP2019/059596, filed on Apr. 15, 2019, which application claims priority to German Application No. DE 10 2018 109 344.6, filed on Apr. 19, 2018, which applications are hereby incorporated herein by reference in their entireties.

FIELD

The disclosure relates to a supply system for supplying multiple consumers with a substance to be applied, preferably paint, for application to motor vehicle bodies and/or add-on parts thereof. The disclosure relates further to an associated coating installation, preferably a painting installation, and to an associated supply method.

BACKGROND

In the prior art, painting installations for painting motor vehicle bodies and/or add-on parts thereof are known in which the consumer devices for receiving and for applying the substance to be applied are supplied with paint by ring-line systems and the ring-line systems are configured as so-called single-pipe systems or 2-pipe systems.

A disadvantage of ring-line systems configured as single-pipe systems is in particular that circulation of paint through the consumer devices is not possible. A disadvantage of ring-line systems configured as 2-pipe systems is in particular that they are not piggable, a large circulated amount of the paint is required, and they are difficult to expand.

There is a need to provide an improved and/or alternative supply system for supplying multiple consumers with a substance to be applied, preferably paint, for application to motor vehicle bodies and/or add-on parts thereof.

DETAILED DESCRIPTION

Figure 1:
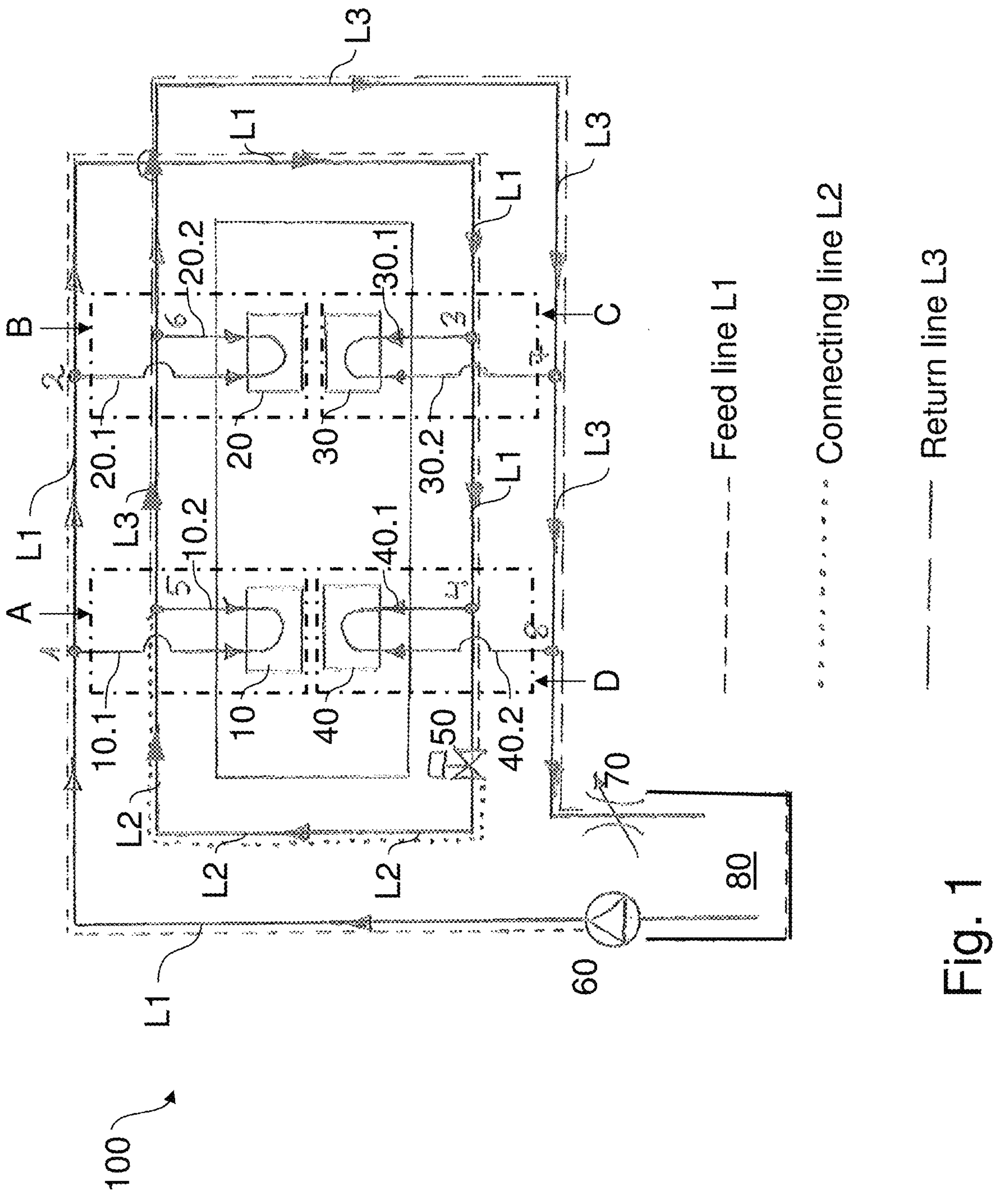
FIG. 1 shows a supply system according to an example of the disclosure in a first operating mode.

The disclosure provides a supply system for supplying multiple consumers with a substance to be applied, preferably paint. The substance to be applied serves in particular for application to motor vehicle bodies and/or add-on parts thereof.

The supply system comprises a feed line (expediently forward-flow line) and a return line (expediently reverse-flow line).

The feed line preferably serves to feed the substance to be applied to the consumers.

The return line preferably serves to return substance to be applied that is not consumed by the consumers for application and accordingly can preferably circulate in the supply system. Within the context of the disclosure, the return line can, however, also function as a feed line.

The supply system comprises in particular a first consumer which is connected to the feed line and the return line. A first consumer device can preferably be associated with the first consumer.

It is possible that the first consumer expediently forms a first consumer of the feed line in the flow direction of the substance to be applied and accordingly, for example, can be connected to the feed line as the first consumer. The first consumer can accordingly preferably constitute the consumer that is supplied first by the supply system and/or the feed line for application of the substance to be applied.

The supply system comprises in particular at least one further consumer which is connected to the feed line and the return line. A further consumer device can preferably be associated with the further consumer.

It is possible that the further consumer expediently forms a last consumer of the feed line in the flow direction of the substance to be applied and accordingly, for example, can be connected to the feed line as the last consumer and/or is arranged after the first consumer in the flow direction of the substance to be applied. The further consumer can accordingly preferably constitute the consumer that is supplied last by the supply system and/or the feed line for application of the substance to be applied.

The supply system is distinguished, for example, in that the feed line is connected, preferably at the end face, to the return line, preferably at the end face, via a connecting line.

It is possible that the connecting line connects an expediently first line portion downstream of the further consumer to an expediently second line portion upstream of the first consumer. The first line portion can accordingly be, for example, part of the feed line and/or of the connecting line. The second line portion can accordingly be, for example, part of the connecting line and/or of the return line.

It is possible that the supply system has a shut-off and the shut-off serves, in an open position, optionally to allow substance to be applied to flow via the connecting line and/or, in a closed position, optionally to prohibit a flow of substance to be applied via the connecting line.

The shut-off can be configured, for example, as a shut-off fitting and/or as a valve arrangement which in particular, for example, is controllable.

The shut-off can, for example, be integrated into the connecting line, be arranged after the further consumer in the flow direction of the substance to be applied, be arranged before the first consumer in the flow direction of the substance to be applied and/or be arranged between the feed line and the return line.

It is possible that the first consumer device, preferably the first consumer, comprises a connector. Alternatively or in addition, it is possible that the further consumer device, preferably the further consumer, comprises a connector. The connector can in particular comprise one or more line portions.

It is possible that the connector of the first consumer device and the connector of the further consumer device serve, in the closed position of the shut-off, to allow substance to be applied to flow from the feed line via the first consumer device and the further consumer device to the return line, so that preferably a circulation of substance to be applied through the first consumer device and the further consumer device is made possible.

Alternatively or in addition, it is possible that the connector of the first consumer device and the connector of the further consumer device serve, in the open position of the shut-off, to prohibit, for example indirectly, a flow of substance to be applied from the feed line via the first consumer device and the further consumer device to the return line, so that preferably a circulation of substance to be applied through the first consumer device and the further consumer device is prevented, for example indirectly, for example because the substance to be applied seeks the path with the lowest resistance, which has the result that no flow of substance to be applied from the feed line via the first consumer device and the further consumer device to the return line takes place and/or there is no circulation of substance to be applied through the first consumer device and the further consumer device.

The flow of substance to be applied can accordingly be controlled, for example, by different flow resistances for the substance to be applied, the substance to be applied taking the path of least resistance. This can be achieved, for example, with or without a valve.

The prevention and/or prohibition can be achieved, for example, by different flow resistances (e.g. without a valve, in particular a bypass valve) for the substance to be applied, examples with a valve (e.g. a bypass valve) alternatively or additionally also being possible.

The connector of the first consumer device and the connector of the further consumer device can, for example, serve, in the closed position of the shut-off, to feed the substance to be applied to the first consumer and the further consumer from the feed line, and/or to prevent substance to be applied from being fed to the first consumer and to the further consumer from the return line.

It is possible that the connector of the first consumer device and the connector of the further consumer device serve, in the open position of the shut-off, to feed the substance to be applied to the first consumer and the further consumer from the feed line and the return line, so that preferably both substance to be applied from the feed line and substance to be applied from the return line can be used for application to the motor vehicle bodies and/or add-on parts thereof. Consequently, within the context of the disclosure, the return line can preferably also function as a feed line for feeding substance to be applied in particular to the first consumer and the further consumer.

It is possible that the first consumer comprises a connector (e.g. mounted on or in the first consumer), so that the connector is preferably part of the first consumer. The further consumer can also comprise a connector (e.g. mounted on or in the further consumer), so that the connector is preferably part of the further consumer.

It is accordingly possible, for example, that the connector of the first consumer device is arranged in or on the first consumer and/or the connector of the further consumer device is arranged in or on the further consumer.

The connector of the first consumer and the connector of the further consumer preferably serve, in the closed position of the shut-off, to allow substance to be applied to flow from the feed line through the first consumer and through the further consumer to the return line, so that preferably a circulation of substance to be applied through the first consumer and the further consumer is made possible, and/or, in the open position of the shut-off, to prohibit a flow of substance to be applied from the feed line through the first consumer and through the further consumer, so that preferably a circulation of substance to be applied through the first consumer and through the further consumer is prevented.

It is possible that the connector of the first consumer device and/or of the first consumer comprises at least one valve, preferably a bypass valve (circulation valve), and the connector of the further consumer device and/or of the further consumer comprises at least one valve, preferably a bypass valve (circulation valve).

Alternatively or in addition, the connector of the first consumer device and/or of the first consumer and the connector of the further consumer device and/or of the further consumer can generate a greater flow resistance for the substance to be applied than the feed line, the return line and/or the connecting line, so that preferably the substance to be applied can take the path of least resistance.

The connector mentioned herein can expediently comprise, for example, a functional unit or multiple functional units which are, for example, spaced apart from one another.

It is possible that the supply system has at least one pig for pigging the feed line, the return line, the connecting line and/or the shut-off.

The feed line, the return line, the connecting line and/or the shut-off can, for example, have an inside diameter which is substantially of the same size and/or substantially constant in order to allow the substance to be applied and/or the at least one pig to pass through.

The supply system preferably comprises a ring-line supply system.

It is possible that the feed line, the return line and the connecting line form a ring-line system.

It is possible that the feed line, the return line and the connecting line form a single-pipe system in which the feed line, the connecting line and the return line preferably form a single flow path and/or are arranged connected in series one after the other. Accordingly, for example in the open position of the shut-off, substance to be applied can preferably circulate in succession from the feed line into the connecting line and from the connecting line into the return line.

The first consumer and/or the further consumer can be, for example, a colour changer, preferably for supplying an applicator for applying the substance to be applied to the motor vehicle bodies and/or add-on parts thereof.

It is possible that the first consumer is connected to an applicator for applying the substance to be applied and/or a first, preferably multi-axis, articulated robot serves to guide the first consumer and/or the applicator.

It is possible that the further consumer is connected to an applicator for applying the substance to be applied and/or a further multi-axis articulated robot serves to guide the applicator and/or the further consumer.

The first consumer can be connected to the feed line, for example, via a first spur line and/or can be connected to the return line via a second spur line. Alternatively or in addition, the further consumer can be connected to the feed line via a first spur line and/or can be connected to the return line via a second spur line.

It is possible that the supply system has at least one additional consumer, preferably at least two additional consumers (e.g. a third consumer and preferably a fourth consumer or even more than four consumers), being connected to the feed line and the return line. The at least one additional consumer can, for example, be arranged between the first consumer and the further consumer in the flow direction of the substance to be applied.

The at least one additional consumer can preferably be configured, be arranged and/or function in the same way as the first consumer and/or the further consumer, so that the disclosure made herein in relation to the first consumer and/or to the further consumer expediently applies also to the at least one additional consumer.

It is possible that the feed line has a pump, preferably on the input side, for conveying the substance to be applied, and/or the return line has a pressure- and/or volume-control means (e.g. a pressure and/or volume regulator) for the substance to be applied. The pressure and/or volume regulator can expediently be configured to be controllable for the activation and/or deactivation (e.g. opening and/or closing) thereof or can be bypassed by a bypass.

The feed line can be connected, for example on the input side, to a feed means for feeding the substance to be applied. Alternatively or in addition, the return line can be connected, in particular on the output side, to the feed means. The feed means can, for example, be accommodated in a colour-mixing room of a coating installation and/or can have a reservoir for substance to be applied.

It is possible that the feed line, the connecting line and the return line extend around the first consumer and the second consumer and preferably the at least one additional consumer preferably substantially helically and/or over more than 360°, for example by means of two loops.

The first consumer can, for example, be connected to the return line as the first consumer in the flow direction of the substance to be applied. Alternatively or in addition, the further consumer can be connected to the return line as the last consumer in the flow direction of the substance to be applied and/or after the first consumer.

It is possible that, in the open position and/or closed position of the shut-off, for example first of all the first consumer, preferably then the at least one additional consumer and finally the further consumer are supplied in succession with substance to be applied from the feed line.

Alternatively or in addition, it is possible that, in the open position of the shut-off, for example first of all the first consumer, preferably then the at least one additional consumer and finally the further consumer are supplied in succession with substance to be applied from the return line, and the return line can accordingly preferably function as the feed line.

The supply system within the context of the disclosure can preferably be operated in a first operating mode and a second operating mode.

In the first operating mode, the shut-off is expediently in the open position, whereby preferably the substance to be applied does not circulate through the first consumer device and the further consumer device and/or it is possible for the substance to be applied to be received by means of the first consumer device and by means of the further consumer device from the feed line and from the return line. Accordingly, within the context of the disclosure, the return line can preferably also function as feed line.

In the second operating mode, the shut-off is expediently in the closed position, whereby preferably the substance to be applied circulates through the first consumer device and the further consumer device and/or it is possible for the substance to be applied to be received by means of the first consumer device and by means of the further consumer device from the feed line, but not from the return line.

The following can preferably be achieved by means of the supply system disclosed herein:

- The feed line, the connecting line, the return line and preferably the shut-off are substantially completely piggable,
- the substance to be applied can circulate via the consumer devices and/or the consumers,
- application of the substance to be applied is possible when the shut-off is both open and shut, so that in particular substance to be applied is able to circulate via the consumer devices and/or the consumers even during application of the substance to be applied,
- when the shut-off is open, substance to be applied both from the feed line and from the return line can be used for application, the consumer devices and/or the consumers do not require dynamic pressure regulators, a dynamic pressure regulator between the feed line and the return line is not required,
- commissioning of the supply system is simple, in particular because spurs, for example from a paint-supply room, are flushable,
- a system adjustment of the supply system can take place from a central location, and/or
- the supply system can expediently be configured for the use of water-borne paint but expediently also for solvent-borne paint. The supply system is accordingly suitable in particular for wet-painting systems.

The applicator disclosed herein can be, for example, an atomiser (e.g. a rotary atomiser, in particular a rotary bell atomiser) or a printing head which preferably comprises multiple outlet openings for substance to be applied for the preferably substantially overspray-free application of the substance to be applied to the motor vehicle bodies and/or add-on parts thereof.

The substance to be applied is preferably paint but may also be, for example, a sealant or adhesive.

In principle, the configuration of the disclosure is independent of whether the supply system is configured to be stationary or movable, for example on one or more robots.

The disclosure relates also to a coating installation, preferably a painting installation, for applying a substance to be applied, preferably paint, to motor vehicle bodies and/or add-on parts thereof, having at least one supply system as disclosed herein.

The disclosure relates further to a supply method for supplying multiple consumers with a substance to be applied, preferably paint, for application to motor vehicle bodies and/or add-on parts thereof, the supply method preferably being carried out by means of at least one supply system as disclosed herein.

In the supply method, a substance to be applied can flow through a feed line and a return line, the substance to be applied being received by a first consumer which is connected to the feed line and the return line and being received by a further consumer which is connected to the feed line and the return line. The feed line is expediently connected to the return line via a connecting line.

The disclosure made herein in relation to the supply system expediently applies also to the supply method.

FIG. 1 shows a supply system 100 for supplying multiple consumers 10, 20, 30 and 40 with a substance to be applied, preferably paint, for application to motor vehicle bodies and/or add-on parts thereof. The arrows in FIG. 1 (and likewise in FIGS. 2 to 4) symbolise the flow direction of the substance to be applied.

Figure 2:
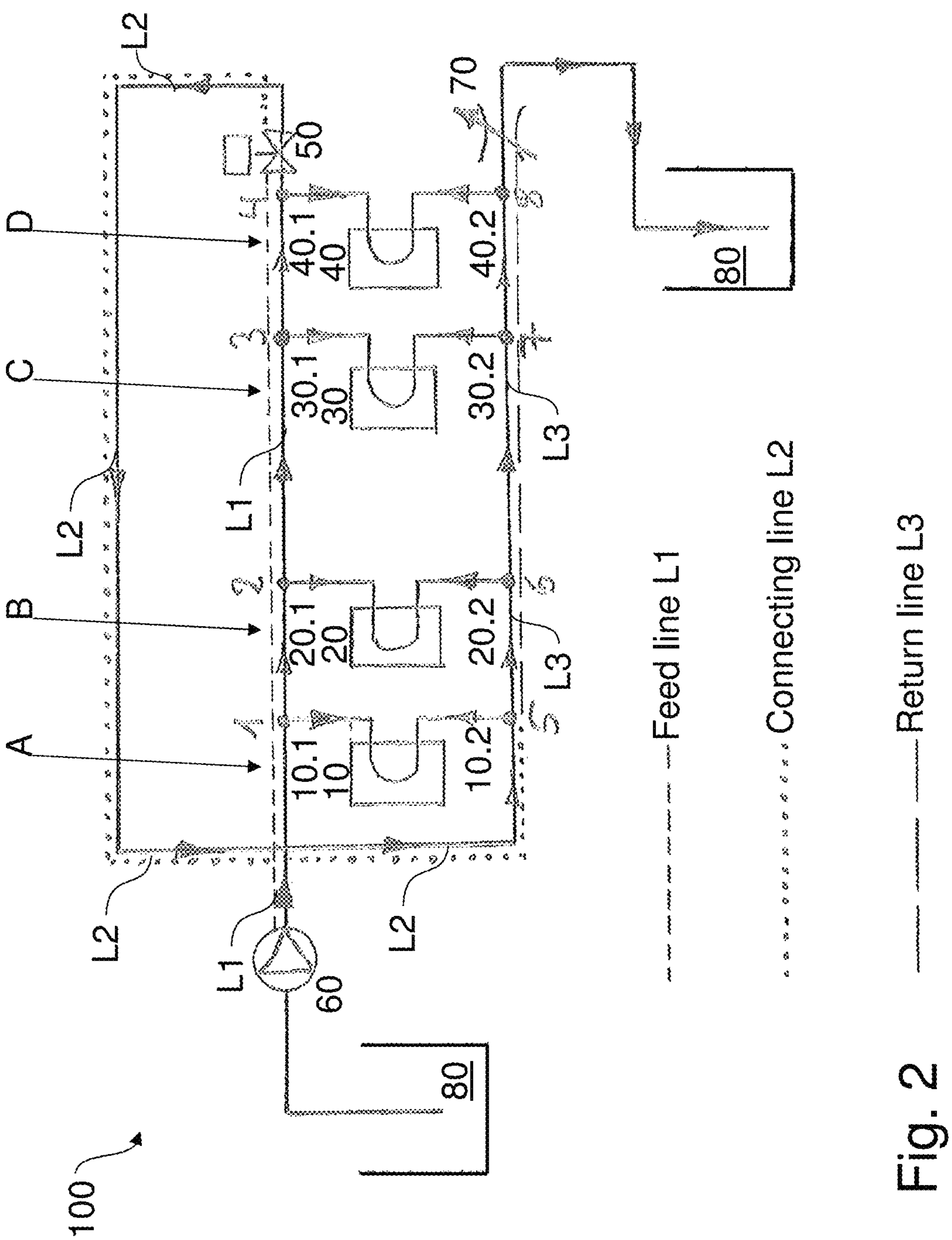
FIG. 2 illustrates the functioning of the supply system in the first operating mode.

FIGS. 1 and 2 show the supply system 100 in a first operating mode, which can also be referred to, for example, as an operating mode with consumer-multiple-spur supply.

The supply system 100 and the first operating mode will be described hereinbelow with joint reference to FIGS. 1 and 2.

The supply system 100 is part of a coating installation, in particular a painting installation, and comprises a feed line L1 (symbolised by short broken lines) and a return line L3 (symbolised by long broken lines).

The consumers 10, 20, 30 and 40 are connected to the feed line L1 and the return line L3 and are configured as colour changers. The colour changers serve to supply substance to be applied to applicators which are guided by means of multi-axis articulated robots and apply the substance to be applied to the motor vehicle bodies and/or add-on parts thereof (not shown in the figures).

The consumer 10 forms a first consumer of the feed line L1 in the flow direction of the substance to be applied. The first consumer 10 is connected via a first spur line 10.1 to the feed line L1 (connection point 1) and via a second spur line 10.2 to the return line L3 (connection point 5). The first consumer 10 with the first spur line 10.1 and the second spur line 10.2 is associated with a first consumer device A (symbolised by a dot-and-dash line in FIG. 1).

The consumer 40 is arranged after the first consumer 10 in the flow direction of the substance to be applied and forms a last consumer of the feed line L1 in the flow direction of the substance to be applied. The consumer 40 is referred to herein as a further, in particular fourth, consumer 40. The fourth consumer 40 is connected via a first spur line 40.1 to the feed line L1 (connection point 4) and via a second spur line 40.2 to the return line L3 (connection point 8). The fourth consumer 40 with the first spur line 40.1 and the second spur line 40.2 is associated with a consumer device D (symbolised by a dot-and-dash line in FIG. 1). The consumer device D is referred to herein as a further, in particular fourth, consumer device D.

The consumers 20 and 30 are arranged between the first consumer 10 and the fourth consumer 40 in the flow direction of the substance to be applied. The consumers 20 and 30 are referred to herein as additional consumers, in particular as a second consumer 20 and third consumer 30. The second consumer 20 is connected via a first spur line 20.1 to the feed line L1 (connection point 2) and via a second spur line 20.2 to the return line L3 (connection point 6). The third consumer 30 is connected via a first spur line 30.1 to the feed line L1 (connection point 3) and via a second spur line 30.2 to the return line L3 (connection point 7). The second consumer 20 with the first spur line 20.1 and the second spur line 20.2 is associated with a second consumer device B (symbolised by a dot-and-dash line in FIG. 1), the third consumer 30 with the first spur line 30.1 and the second spur line 30.2 being associated with a third consumer device C (symbolised by a dot-and-dash line in FIG. 1).

Points 1 and 5 constitute connection points of the first consumer device A and in particular of the first consumer 10 to the feed line L1 and the return line L3.

Points 2 and 6 constitute connection points of the second consumer device B and in particular of the second consumer 20 to the feed line L1 and the return line L3.

Points 3 and 7 constitute connection points of the third consumer device C and in particular of the third consumer 30 to the feed line L1 and the return line L3.

Points 4 and 8 constitute connection points of the fourth consumer device D and in particular of the fourth consumer 40 to the feed line L1 and the return line L3.

A connecting line L2 connects the feed line L1 to the return line L3, so that a line portion downstream of the further consumer 40 is connected to a line portion upstream of the first consumer 10.

The feed line L1, the connecting line L2 and the return line L3 form a ring-line system, in particular a single-pipe system, so that the feed line L1, the connecting line L2 and the return line L3 are arranged, for example, connected in series one after the other and in particular form a single flow path which, however, can be configured, for example, of multiple pipes mounted on one another. The feed line L1, the connecting line L2 and the return line L3 extend around the consumers 10, 20, 30 and 40 substantially helically and/or over more than 360°, in particular by means of two loops.

Figure 3:
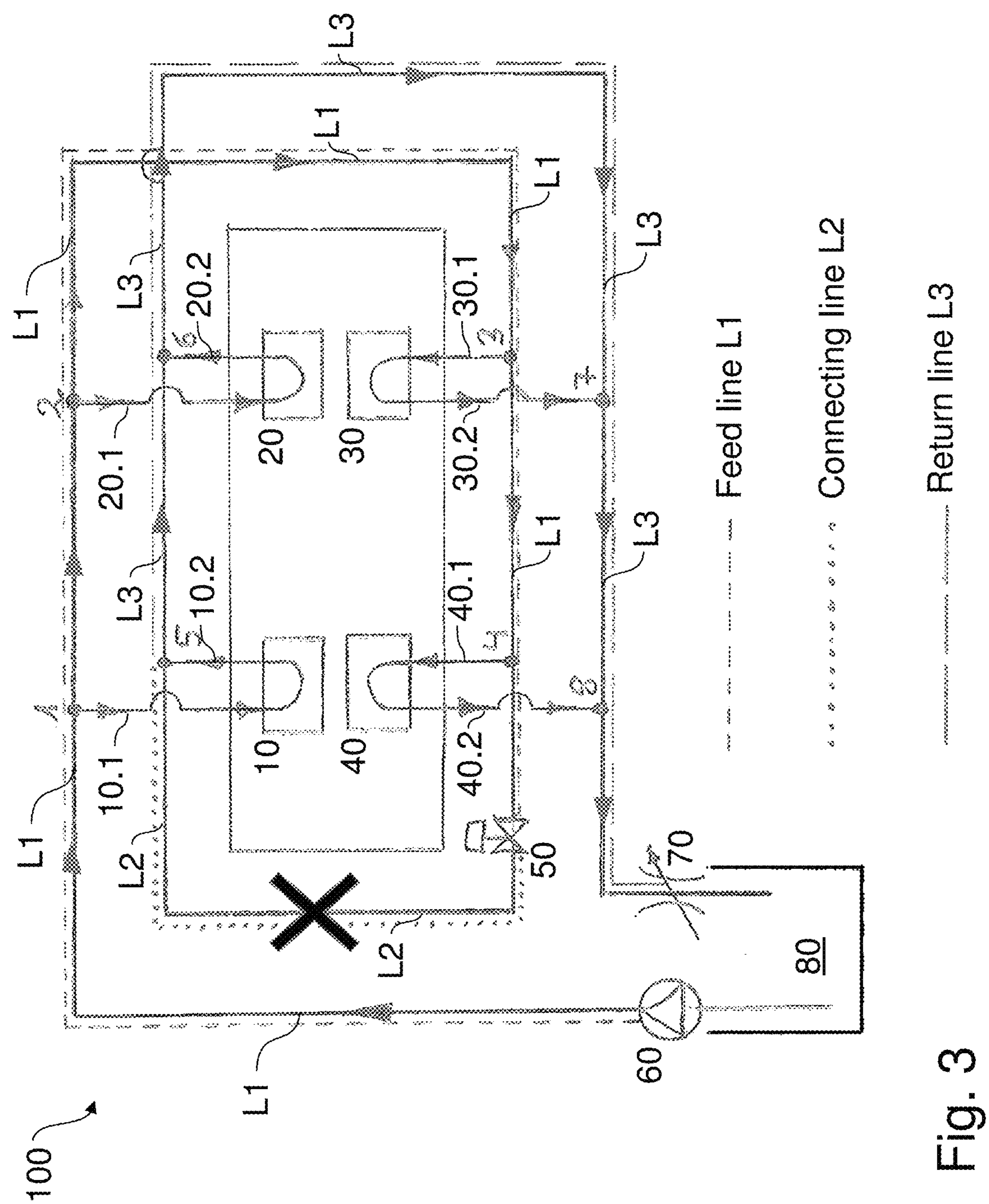
FIG. 3 shows the supply system in a second operating mode.
Figure 4:
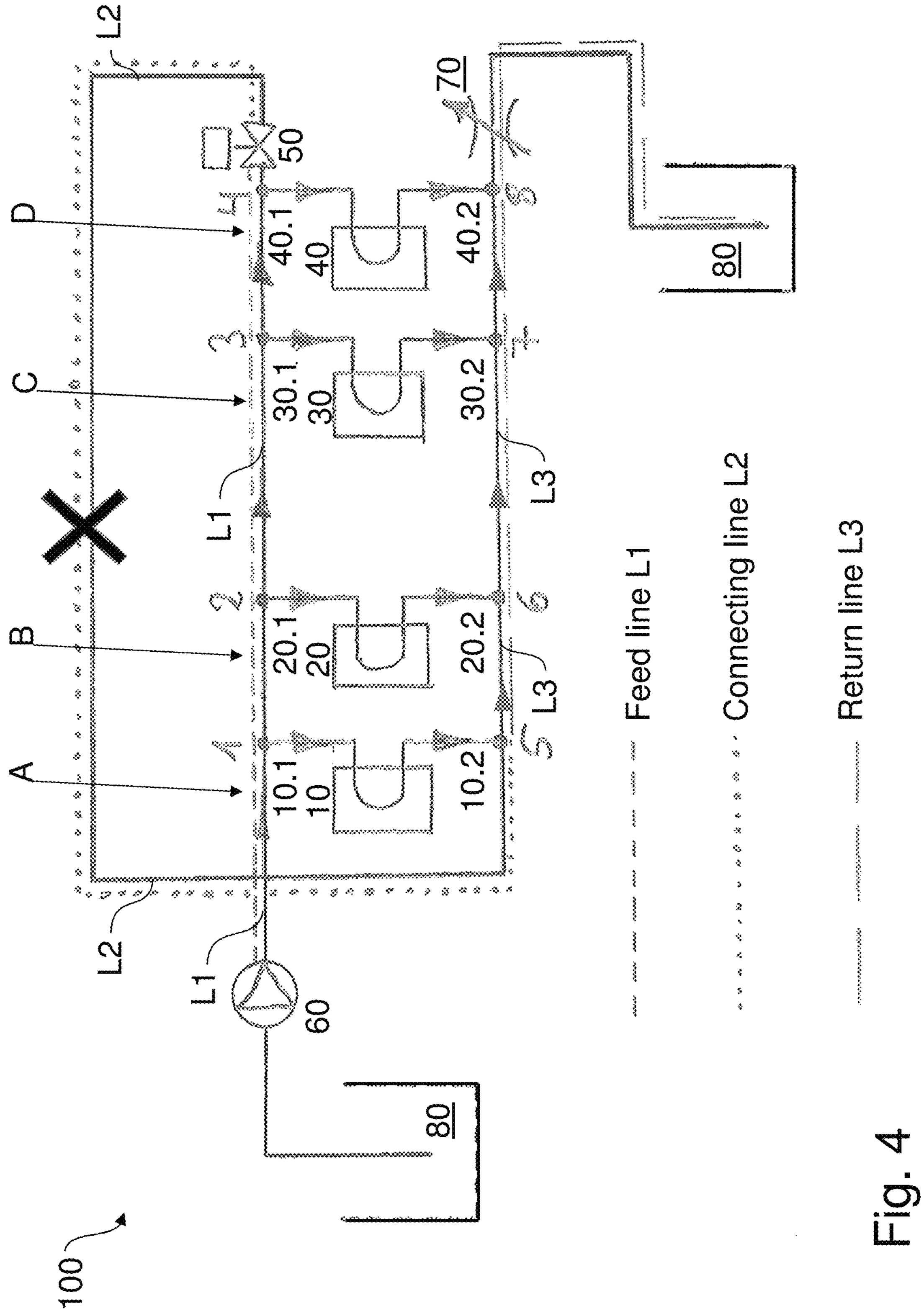
FIG. 4 illustrates the functioning of the supply system in the second operating mode.

The supply system 100 comprises a shut-off 50 which is configured, for example, as a shut-off fitting or valve arrangement, the shut-off 50 being configured in order to selectively, in an open position, allow substance to be applied to flow via the connecting line L2 (FIGS. 1 and 2—first operating mode), and in order to selectively, in a closed position, prohibit a flow of substance to be applied via the connecting line L2 (FIGS. 3 and 4—second operating mode). The shut-off 50 is arranged after the fourth consumer 40 and before the first consumer 10 in the flow direction of the substance to be applied, in particular is integrated into the connecting line L2 between the feed line L1 and the return line L3.

In the first operating mode, the shut-off 50 is in an open position, so that a flow of substance to be applied from the feed line L1 via the connecting line L2 to the return line L3 is made possible.

Each of the consumers 10, 20, 30 and 40 comprises a connector which generates a greater flow resistance for the substance to be applied compared to the feed line L1 and the return line L3. Alternatively or in addition, the connector can also comprise a valve, preferably a bypass valve (circulation valve).

The connector of the first consumer 10 serves, in the open position of the shut-off 50, to prohibit a flow of substance to be applied from the feed line L1 through the first consumer 10, so that a circulation of substance to be applied through the first consumer 10 is prevented. In addition, the connector of the first consumer 10 serves, in the open position of the shut-off 50, to feed the substance to be applied to the first consumer 10 from the feed line L1 and the return line L3, so that both substance to be applied from the feed line L1 and substance to be applied from the return line L3 can be used for application to the motor vehicle bodies and/or add-on parts thereof. The return line L3 within the context of the disclosure can accordingly also serve as a feed line for feeding substance to be applied to the first consumer 10.

In order to achieve the above-described flow of substance to be applied, the connector can provide a greater flow resistance for the substance to be applied than the feed line L1 and the return line L3, no valve being required for this purpose. However, the disclosure also includes examples in which the connector comprises a valve (e.g. bypass or circulation valve). The substance to be applied expediently takes the path of least resistance.

The fourth consumer 40 and preferably the second consumer 20 and the third consumer 30 are preferably configured in the same way as the first consumer 10 and preferably function in the same way as the first consumer 10, so that the description given hereinbefore in relation to the first consumer 10 expediently applies also to the fourth consumer 40 and preferably the second consumer 20 and the third consumer 30.

In the first operating mode, the feed line L1 supplies the consumers 10, 20, 30 and 40 in succession with the substance to be applied for application to the motor vehicle bodies and/or add-on parts thereof, namely first of all the first consumer 10 (via connection point 1), then the second consumer 20 (via connection point 2), then the third consumer 30 (via connection point 3) and finally the fourth consumer 40 (via connection point 4).

In the first operating mode, the return line L3 supplies the consumers 10, 20, 30 and 40 in succession with the substance to be applied for application to the motor vehicle bodies and/or add-on parts thereof, namely first of all the first consumer 10 (via connection point 5), then the second consumer 20 (via connection point 6), then the third consumer 30 (via connection point 7) and finally the fourth consumer 40 (via connection point 8).

The supply system 100 can comprise one or more pigs (not shown in the figures) for pigging the feed line L1, the connecting line L2, the return line L3 and preferably the shut-off 50.

The feed line L1, the return line L3, the connecting line L2 and preferably the shut-off 50 have an inside diameter which is substantially of the same size and substantially constant in order to allow the substance to be applied and the at least one pig to pass through.

FIGS. 3 and 4 show the supply system 100 in a second operating mode, which can also be referred to, for example, as an operating mode with circulation of substance to be applied through consumer devices. The supply system 100 and the second operating mode will be described hereinbelow with joint reference to FIGS. 3 and 4.

In the second operating mode, the shut-off 50 is in a closed position, so that a flow of substance to be applied from the feed line L1 via the connecting line L2 to the return line L3 is prohibited.

The connector of the first consumer 10 serves, in the closed position of the shut-off 50, to allow substance to be applied to flow from the feed line L1 through the first consumer 10 to the return line L3, so that a circulation of substance to be applied through the first consumer 10 is made possible. In addition, the connector of the first consumer 10 serves, in the closed position of the shut-off 50, to feed the substance to be applied to the first consumer 10 from the feed line L1, substance to be applied not being fed to the first consumer 10 from the return line L3, however.

The fourth consumer 40 and preferably the second consumer 20 and the third consumer 30 are preferably configured in the same way as the first consumer 10 and preferably function in the same way as the first consumer 10, so that the description given hereinbefore in relation to the first consumer 10 expediently applies also to the fourth consumer 40 and preferably the second consumer 20 and the third consumer 30.

In the second operating mode, the feed line L1 supplies the consumers 10, 20, 30 and 40 in succession with the substance to be applied for application to the motor vehicle bodies and/or add-on parts thereof, namely first of all the first consumer 10 (via connection point 1), then the second consumer 20 (via connection point 2), then the third consumer 30 (via connection point 3) and finally the fourth consumer 40 (via connection point 4).

In the second operating mode, the return line L3 returns substance to be applied from the consumers 10, 20, 30 and 40 in succession, namely first of all from the first consumer 10 (via connection point 5), then from the second consumer 20 (via connection point 6), then from the third consumer 30 (via connection point 7) and finally from the fourth consumer 40 (via connection point 8).

The supply system 100 can consequently be operated in a first operating mode and a second operating mode.

In the first operating mode, the shut-off 50 is in the open position, whereby there is no circulation of the substance to be applied through the consumer devices A, B, C and D and consumption and accordingly application of the substance to be applied is possible from the feed line L1 and the return line L3.

In the second operating mode, the shut-off 50 is in the closed position, whereby circulation of the substance to be applied through the consumer devices A, B, C and D takes place and consumption and accordingly application of the substance to be applied is possible from the feed line L1 but not from the return line L3.

In the exemplary supply system 100 shown in FIGS. 1 to 4, the connector are integrated into the consumers 10, 20, 30 and 40, or at least mounted thereon. However, the disclosure is not limited thereto. Thus, the connector may also be arranged, for example, outside the consumers 10, 20, 30 and 40, for example spaced apart therefrom, so that it is possible within the context of the disclosure that the connector may be comprised not by the consumers 10, 20, 30, 40 specifically but by the consumer devices A, B, C and D generally, whereby, for example, in the closed position of the shut-off 50, a flow of substance to be applied from the feed line L1 via the consumer devices A, B, C and D to the return line L3 is made possible, so that a circulation of substance to be applied through the consumer devices A, B, C and D is made possible, and/or in order, in the open position of the shut-off 50, to prohibit a flow of substance to be applied from the feed line L1 via the consumer devices A, B, C and D to the return line L3, so that a circulation of substance to be applied through the consumer devices A, B, C and D is prevented.

The disclosure is not limited to the examples described above. In fact, a large number of variants and modifications are possible which likewise make use of the inventive idea and therefore likewise fall within the scope of protection. In addition, the disclosure also claims protection for the subject-matter and the features of the dependent claims, independently of the features and claims that are referenced.

The invention claimed is:

1. A supply system comprising:

a feed line, a return line, the feed line connected to the return line via a connecting line, a first consumer device which comprises a first consumer, the first consumer being connected to the feed line before the connecting line in a flow direction of a substance to be applied and being connected to the return line, and a further consumer device which comprises a further consumer, the further consumer being connected to the feed line before the connecting line in the flow direction of the substance to be applied and being connected to the return line, the further consumer being connected to the feed line after the first consumer in the flow direction of the substance to be applied, wherein the first consumer is connected to the return line as the first consumer in the flow direction of the substance to be applied and the further consumer is connected to the return line as the last consumer in the flow direction of the substance to be applied.

2. The supply system according to claim 1, wherein the connecting line connects a line portion downstream of the further consumer to a line portion upstream of the first consumer.

3. The supply system according to claim 2, wherein the supply system has a shut-off valve in order to selectively, in an open position, allow substance to be applied to flow via the connecting line, and in order to selectively, in a closed position, prohibit a flow of substance to be applied via the connecting line.

4. The supply system according to claim 1, further comprising at least one pig for pigging the feed line.

5. The supply system according to claim 1, wherein the feed line, the return line, the connecting line and the shut-off valve have an inside diameter which is substantially of the same size.

6. The supply system according to claim 1, wherein the feed line, the return line and the connecting line form a ring-line system.

7. The supply system according to claim 1, wherein the feed line, the return line and the connecting line form a single-pipe system and accordingly form a single flow path.

8. The supply system according to claim 1, wherein the first consumer or the further consumer is a colour changer.

9. The supply system according to claim 1, wherein the first consumer is connected to the feed line via a first spur line and is connected to the return line via a second spur line, and the further consumer is connected to the feed line via the first spur line and is connected to the return line via the second spur line.

10. The supply system according to claim 1, wherein the feed line has a pump for conveying the substance to be applied, and the return line has a pressure control.

11. A supply system comprising:

a feed line, a return line, the feed line connected to the return line via a connecting line, a first consumer device which comprises a first consumer, the first consumer being connected to the feed line before the connecting line in a flow direction of a substance to be applied and being connected to the return line, and a further consumer device which comprises a further consumer, the further consumer being connected to the feed line before the connecting line in the flow direction of the substance to be applied and being connected to the return line, the further consumer being arranged after the first consumer in a flow direction of a composition to be applied, wherein the first consumer is connected to the feed line before the connecting line in the flow direction of the substance to be applied via a first spur line and is connected to the return line via a second spur line, and the further consumer is connected to the feed line before the connecting line in the flow direction of the substance to be applied via another first spur line and is connected to the return line via another second spur line.

12. The supply system according to claim 11, wherein the connecting line connects a line portion downstream of the further consumer to a line portion upstream of the first consumer.

13. The supply system according to claim 12, wherein the supply system has a shut-off valve in order to selectively, in an open position, allow substance to be applied to flow via the connecting line, and in order to selectively, in a closed position, prohibit a flow of substance to be applied via the connecting line.

14. The supply system according to claim 11, further comprising at least one pig for pigging the feed line.

15. The supply system according to claim 11, wherein the feed line, the return line, the connecting line and the shut-off valve have an inside diameter which is substantially of the same size.

16. The supply system according to claim 11, wherein the feed line, the return line and the connecting line form a ring-line system.

17. The supply system according to claim 11, wherein the feed line, the return line and the connecting line form a single-pipe system and accordingly form a single flow path.

18. The supply system according to claim 11, wherein the first consumer or the further consumer is a colour changer.

19. The supply system according to claim 11, wherein the feed line has a pump for conveying the substance to be applied, and the return line has a pressure control.

* * * * *